Figure 3:
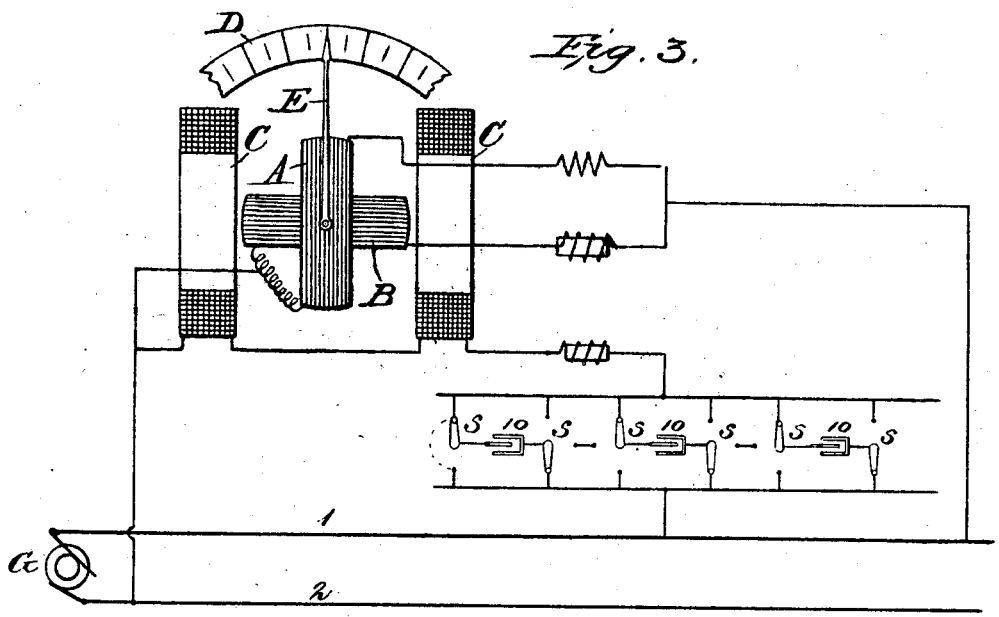

No. 679,175. Patented July 23, 1901.
P. M. LINCOLN.
FREQUENCY OR SPEED INDICATING AND REGULATING DEVICE.
(Application filed Mar. 27, 1901.)
(No Model.) 3 Sheets—Sheet 1.
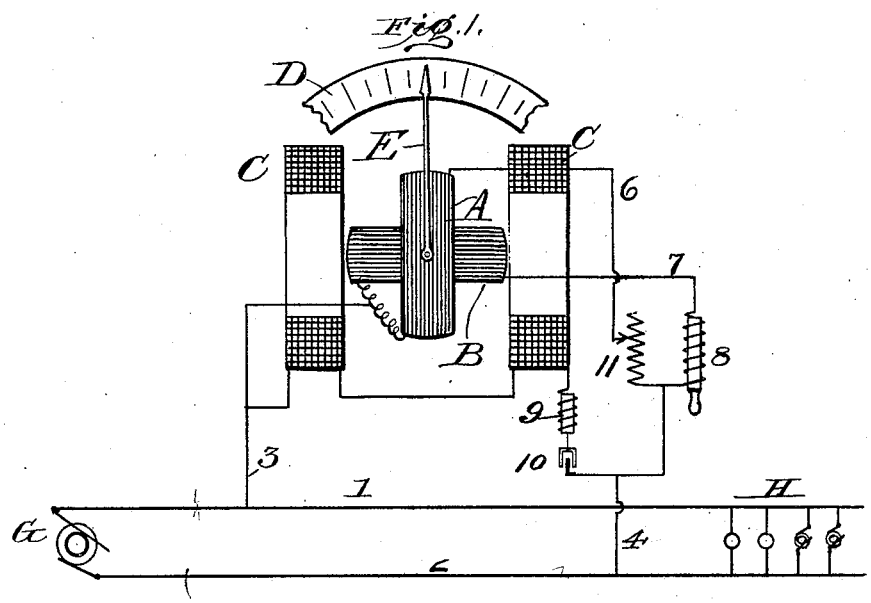
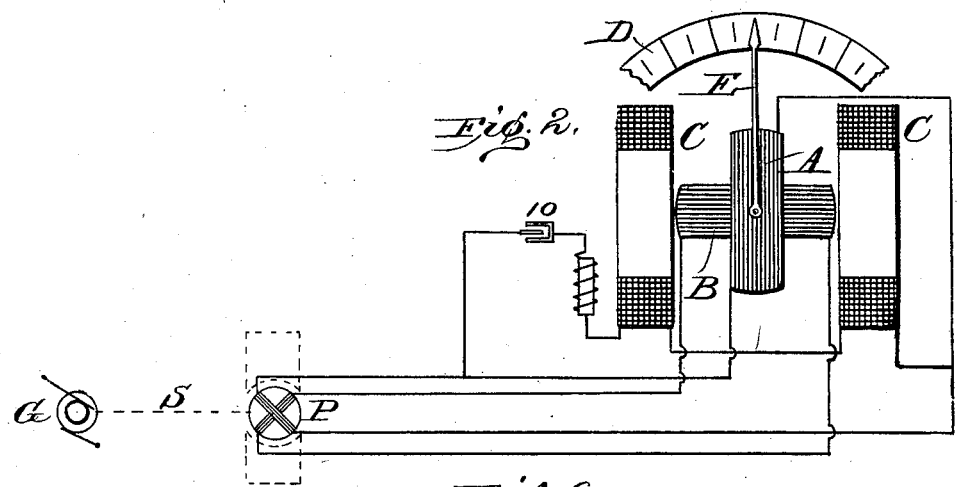
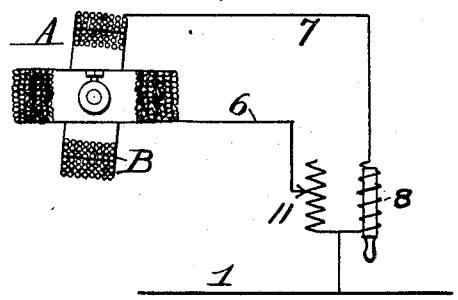
Witnesses:
F. L. Ourand
Albert Popkins
Inventor:
P. M. Lincoln
by Sturtevant & Greeley
Attys.

No. 679,175. Patented July 23, 1901.
P. M. LINCOLN.
FREQUENCY OR SPEED INDICATING AND REGULATING DEVICE.
(Application filed Mar. 27, 1901.)
(No Model.) 3 Sheets—Sheet 2.

Witnesses
F. L. Orrand
Albert Popkins

Inventor
Paul M. Lincoln
by Sturtevant & Greeley
Attorneys

No. 679,175. Patented July 23, 1901.
P. M. LINCOLN.
FREQUENCY OR SPEED INDICATING AND REGULATING DEVICE.
(Application filed Mar. 27, 1901.)
(No Model.) 3 Sheets—Sheet 3.

Witnesses.
F. L. Ourand
Albert Popkins

Inventor.
Paul M. Lincoln
by Sturtevant & Greeley
Attorneys.

UNITED STATES PATENT OFFICE.

PAUL M. LINCOLN, OF NIAGARA FALLS, NEW YORK.

FREQUENCY OR SPEED INDICATING AND REGULATING DEVICE.

SPECIFICATION forming part of Letters Patent No. 679,175, dated July 23, 1901.

Application filed March 27, 1901. Serial No. 53,125. (No model.)

*To all whom it may concern:*

Be it known that I, PAUL M. LINCOLN, a citizen of the United States, residing at Niagara Falls, in the county of Niagara, State of New York, have invented certain new and useful Improvements in Frequency or Speed Indicating and Regulating Devices, of which the following is a description, reference being had to the accompanying drawings and to the letters and figures of reference marked thereon.

My invention relates to alternating-current-measuring instruments, and particularly to that class of instruments which are responsive to changes of frequency or periodicity in an alternating-current circuit. This property makes it possible to correctly measure the speed of a revolving shaft, and it may also be used to regulate or control apparatus which it is desired to control with reference to the speed of a revolving shaft or the frequency of an alternating current. To this end I make use of two systems of coils relatively movable. One system consists of a single coil adapted to create an alternating field. The other system consists of two coils placed within the field created by the first coil, these two coils being relatively fixed, but angularly displaced and carrying currents from the same source, but displaced from each other by an electrical angle, preferably of ninety degrees. If one system of coils be connected to a source of alternating current and be so placed as to be free to revolve about its axis and the other system be connected to the same source, then if the currents in the two systems vary in their phase relations the movement of the suspended system will be a correct and proportional indication of the angular change in phase relations in the two circuits, provided that both a mechanical and electrical displacement of ninety degrees be maintained between the two relatively-fixed coils, and their ampere-turns are made equal.

In my present invention I utilize this instrument as a frequency-indicator by making use of the principle of resonance. As is well known, resonance occurs in an alternating-current circuit when the reciprocal of the product of the self-induction in henries and the capacity in farads is equal to a constant multiplied by the square of the frequency, so that by properly proportioning the capacity and inductance a resonant circuit may be obtained for any given selected frequency, and at this frequency there will be neither lag nor advancement of the current with reference to its electromotive force. It is a well-known fact that for a resonant or nearly-resonant circuit there is a rapid change in the power factor of the current flowing through it for comparatively small changes of frequency, and accordingly if the circuit to which one of the two systems of coils in the phase-meter is connected be tuned to resonance for a selected or normal frequency any departure from that frequency will be measured by the movable element of the indicator.

My invention will more fully appear from the following description, while its scope will be more particularly pointed out in the appended claims.

Figure 4:
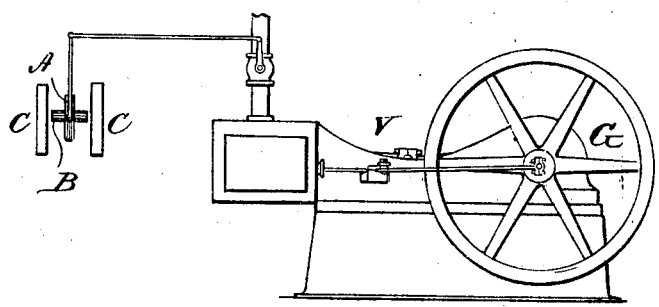
Figure 5:
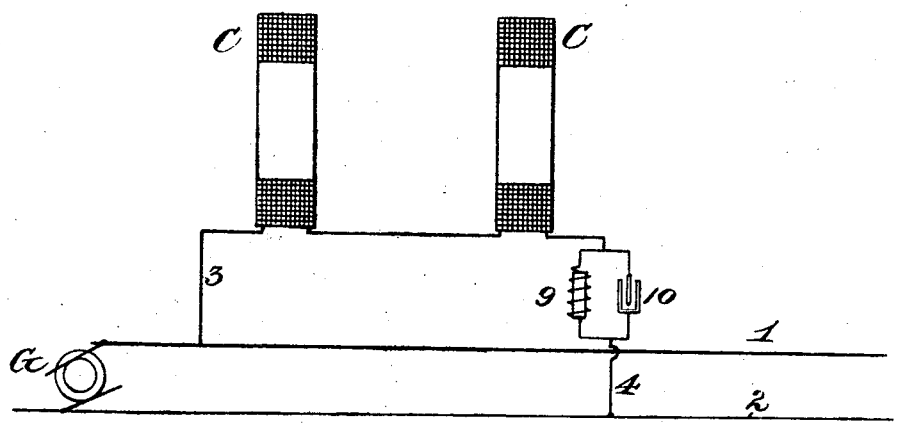
Figure 7:
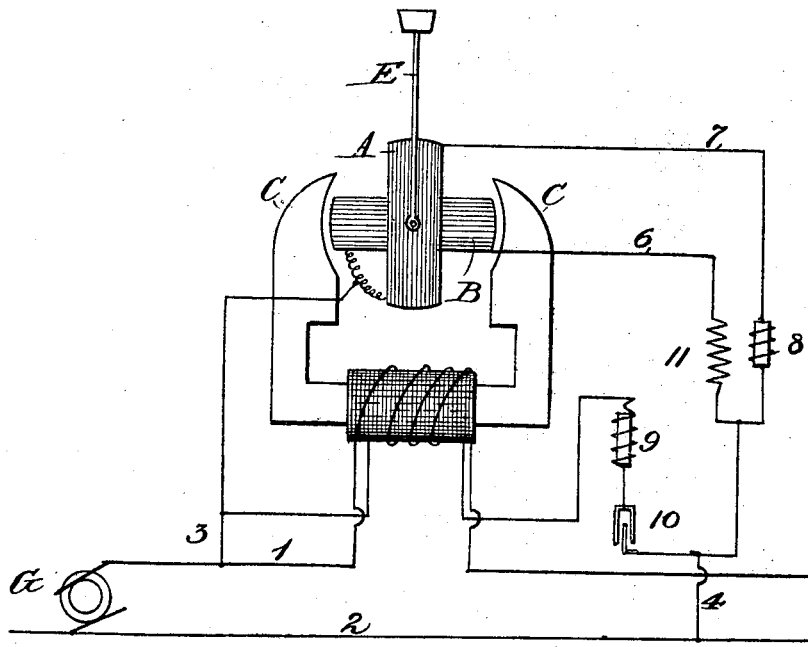

Figure 1 is a diagrammatic view of my frequency-indicator applied to a single-phase alternating circuit. Fig. 2 shows its application as a speed-indicator. Fig. 3 shows an arrangement for measuring widely-different frequencies. Fig. 4 shows its use as a regulator. Fig. 5 shows a different arrangement of indicator connections. Fig. 6 shows a modified construction of the two coil elements, and Fig. 7 shows an arrangement of parts for effecting automatically an unbalancing of the tuned circuit.

Referring particularly to Fig. 1, G is a generator supplying alternating currents to translating devices H through the mains 1 and 2.

C is a stationary field-coil in series with the inductive resistance 9 and the condenser 10 and placed in a shunt-circuit to the mains 1 and 2 through the leads 3 and 4. The condenser and inductive resistance are so chosen that this circuit is tuned for the normal frequency of the generator G. Usually the inductive resistance 9 may be omitted and the condenser adjusted to produce resonance with the inductance of the field C. The coils A and B are suspended in the field of C and are free to move without the restraining influence of any spring or other mechanical check. A and B are in two separate branches of a circuit derived from the leads 3 and 4, and therefore also in shunt to the mains 1 and 2. The current in one of the coils—in this instance A—is substantially in phase with the electromotive force of G, while the current in the other is by phase-modifying means maintained substantially in quadrature therewith. These phase-modifying means in this instance consist of a non-inductive resistance 11 in the branch 6, containing the coil A, and an inductive resistance 8 in the branch 7 in series with the coil B.

E is a pointer or hand carried by the moving element, while D is a suitably-calibrated scale so disposed that the relative movement of E may be readily ascertained.

Under the conditions above supposed it is plain that at normal frequency the current in C is substantially in phase with the electromotive force and the movable coils will take up a position approximating that shown in Fig. 1, with coil B parallel to the field of C. In the event of an increase in the frequency on the line the current in C will lag behind the electromotive force and the coils A and B will assume a new position, such that the forces acting upon them are in equilibrium. This angular movement will correctly measure the angle of lag and by a properly-calibrated scale will show the increase in frequency. On a decrease in frequency the opposite effect is produced.

It is evident that the indicator not only shows the frequency upon the line, but, as a matter of fact, may be made a speed-indicator for the generator G by properly calibrating the scale. An illustration of a simple way in which the speed of any shaft may be indicated by the use of this instrument is shown in Fig. 2. I here make use of a small auxiliary generator P, which, if made to yield two-phase currents, may also dispense with the need of the phase-modifying means for the coils A and B. This auxiliary generator can be made small and in a simple manner, its only purpose being to supply impulses to the coils of the indicator of a frequency proportional to the speed to be measured. To this end I construct a small portable generator adapted to be attached to and driven by the shaft S in question at the same speed.

With the two-phase generator shown one circuit supplies the coil B, the other the coils A and C, the branch containing C, however, being tuned for a normal frequency corresponding to the normal speed for which the instrument is intended.

It is plain that the indicator may be placed either near the shaft S and the generator P or at a considerable distance therefrom without affecting the indication. It is also to be observed that the pointer not only indicates the rate of speed, but its movement also shows the direction, for there will be a difference of one hundred and eighty degrees in the indication of the pointer between normal frequency in one direction and normal frequency in the opposite direction.

Fig. 3 shows an arrangement of condensers, three in number, whereby any combination of series and parallel connection may be obtained. This is effected by means of the switches s. In this way various capacities may be secured and the instrument tuned for frequencies or speeds which are widely divergent. For each grouping of condensers there should be a separate scale provided. This adjustment is valuable for the reason that it permits the measurement of different speeds at or near conditions of greatest sensitiveness.

In Fig. 4 the indicator is shown as controlling the valve of an engine V, driving the generator G. The indicator here is influenced by the frequency of the currents supplied by G, which in turn is dependent upon the speed of the engine. If the speed increases unduly, the indicator will, through the system of levers shown, move the throttle in the proper direction to correct such increase, and a decrease will produce the reverse effect.

Fig. 5 shows an arrangement of the inductive resistance 9 and the condenser 10 in a parallel relation with each other, which is given as an instance of the great variety of ways this instrument may be constructed.

I have discovered that this instrument may be made abnormally sensitive at certain points or positions in its indication, and this sensitiveness may be attained as follows: By making the ampere-turns of coil B greater than those of coil A points of maximum sensitiveness are obtained at the normal position of the indicator and one hundred and eighty degrees therefrom, or, in other words, when the coil B is in a position parallel to the field of C. On the other hand, by making the ampere-turns of A greater than those of B the sensitiveness at normal frequency is decreased. By selecting an angle of electrical displacement between the currents flowing in the coils A and B different from ninety degrees these points of maximum sensitiveness between change in mechanical angle and that in phase angle will be located about forty-five degrees and two hundred and twenty-five degrees on the one side or the other of the normal position, according as a positive or negative electrical angle is chosen and also depending on whether the electrical angle is greater or less than ninety degrees, the sensitiveness being greater as the departure of the electrical angle from ninety degrees is increased. Changing the mechanical angle between A and B so as to cause a departure from ninety degrees will also increase the sensitiveness at points about forty-five degrees and two hundred and twenty-five degrees from the normal position. By using these adjustments severally or in combination points of maximum sensitiveness may be given to any predetermined position of the indicator. This is an especially-valuable feature when this instrument is used as a regulator of speed or voltage, for by one of the adjustments mentioned or a combination of two or more an abnormal sensitiveness may be given at or near the points of precise regulation. I have also discovered that the adjustment of the mechanical angle above described may be employed to cause the suspended element to move proportionally to changes in the phase relations between the currents in the two systems of coils, even though exact quadrature does not exist between the currents in the two-coil element. This is accomplished by making the mechanical angle between the two coils equal to the supplement of the electrical angle existing between the currents flowing therein.

In Fig. 6 is shown a modified construction of the two-coil element which may be used in place of that shown in Fig. 1. When used in connection with the adjustable phase-modifying means therein shown, all the features of adjustment above set forth for giving predetermined points of maximum sensitiveness may be utilized.

The frequency or speed corresponding to the normal position of the indicator being dependent upon the balance between the inductive resistance and the capacity in the tuned circuit an unbalancing of this relation may not only be effected by the adjustments hereinbefore described, but may be made to automatically take place when the indicator is used as a regulator or in other special connections where it is desired that the movement of the indicator shall be a function of both the speed and some other variable quantity. An instance of how this unbalancing is automatically effected by altering the inductance—in this case with changes of load—is shown in Fig. 7. This construction is similar to that shown in Fig. 1, save for the fact that in addition to the shunt or field coil the stationary member has a few turns of the series circuit wrapped around its field-magnet. An increasing current in this series coil will send a greater or less number (depending on its relative direction) of lines of force through the field of the indicator, and thus change the inductive resistance of the field-coil. This causes the pointer E to take a position dependent both upon the speed or frequency but also upon the current in the mains, and the regulation it is designed to effect will be accordingly influenced by both speed and load.

In connection with the instrument used either as a frequency or speed indicator I have discovered that its sensitiveness at or near the point of resonance or normal frequency or speed may also be increased by making the inductance of the tuned circuit great as compared with the resistance.

The advantages of a frequency or speed indicator, as above described, are mainly: Its greatest sensitiveness and accuracy come at the point of normal speed, increased sensitiveness may be given at any desired speed, it may be placed anywhere on the circuit, it is "dead-beat" and has no constantly-wearing parts, it can be changed to different normal frequencies by changing the ratio between the inductance and capacity in circuit, and its sensitiveness may be varied by altering the proportion between the resistance and inductance.

It is obvious that various arrangements of the connections and parts may be employed without departing from the spirit of my invention.

Having thus described my invention, what I claim as new, and desire to secure by Letters Patent, is—

1. In an alternating-current-measuring instrument, the combination of a stationary field-producing element, a movable field-producing element, means for effecting a phase displacement of the field of one element with changes in frequency, and means for indicating such displacement; substantially as described.

2. A frequency-indicator, consisting of a stationary field-producing element, a movable field-producing element, and a circuit containing inductance and capacity associated with one of said elements; substantially as described.

3. A frequency-indicator, consisting of a stationary field-producing element, a movable field-producing element, and an inductance and capacity in series with one of the said elements; substantially as described.

4. A frequency-indicator, consisting of a stationary field-producing element, a movable field-producing element, and a circuit tuned to a definite frequency associated with one of said elements; substantially as described.

5. A frequency-indicator, consisting of a stationary field-producing element, a movable field-producing element, and a circuit tuned to a definite frequency, including one of said elements; substantially as described.

6. An alternating-current-measuring instrument, comprising two systems of coils, relatively movable, one consisting of a single coil included in a circuit tuned to normal frequency, the other consisting of two relatively-fixed coils angularly displaced and adapted to carry currents of displaced phase; substantially as described.

7. In a speed-indicator, the combination with a rotating body, whose speed is to be measured, of an indicator comprising a stationary field-producing element, and a movable field-producing element, one of the elements being included in a circuit tuned for normal speed or frequency, and means for supplying said elements with currents of a frequency proportional to the speed of said body; substantially as described.

8. In a speed-indicator, the combination with a rotating body, whose speed is to be measured, of an indicator comprising a stationary field-producing element, and a movable field-producing element, one of said elements producing two angularly-displaced fields, means for supplying said latter element with phase-displaced currents of a frequency proportional to the speed of said body, and means for changing the phase relations of the fields produced by the two elements with changes in frequency; substantially as described.

9. The combination of a rotating body, whose speed is to be measured, a two-phase generator attached thereto, an indicator, comprising a stationary field-producing element, and a movable field-producing element, connections between one of said elements, and the said generator, and means for varying phase relations of the fields produced by the two elements with changes in frequency; substantially as described.

10. In an alternating-current-measuring instrument, the combination of two systems of field-coils, one system being free to adjust its position relatively to the other, a source of alternating current, connections between said source and said coils, and means for causing changes in the frequency of the alternating current to alter the relative position of the two field-coil systems; substantially as described.

11. In an alternating-current-measuring instrument, the combination of a stationary field-producing element, a movable field-producing element, an alternating-current generator, connections between the alternating-current generator and the field-producing elements, and means for causing said movable field-producing element to indicate the speed and direction of rotation of said alternating-current generator; substantially as described.

12. In a speed-indicator, having a point of maximum sensitiveness corresponding to a given speed, the combination of two elements relatively movable, electrically-actuated means for exerting reactive effects between the two elements, and means for changing the point of maximum sensitiveness to correspond to a different speed; substantially as described.

13. A frequency-indicator adjusted to a point of maximum sensitiveness corresponding to a normal frequency in combination with means for changing the point of maximum sensitiveness to correspond to a different frequency; substantially as described.

14. In an alternating-current-measuring instrument, the combination of a movable member, a stationary member, a circuit adjusted to a normal frequency including one of said members, and means for adjusting said circuit to a different frequency; substantially as described.

15. In an alternating-current-measuring instrument, the combination of a stationary field-producing element, a movable field-producing element, means for effecting a phase displacement of the field of one element with changes in frequency, and means for effecting a plurality of adjustments in said instrument to measure different frequencies; substantially as described.

16. In an alternating-current-measuring instrument, the combination of a member free to move without mechanical restraint, a stationary member, means for supplying said members with alternating current, such that said movable member is acted upon by two opposing torques, and means for balancing said torques at different positions of the movable member, corresponding to different frequencies; substantially as described.

17. The combination of a phase responsive device, means for acting upon the same through a plurality of currents, means for effecting a phase displacement of said currents with changes in frequency in a tuned circuit, and means for automatically unbalancing said circuit; substantially as described.

18. In a frequency or speed indicator, the combination of an element creating an alternating field through the influence of a circuit tuned to a given frequency, a second element creating two alternating fields, and means for adjusting the relations of the two last-named fields; substantially as described.

19. In a frequency or speed indicator, the combination of an element producing a torque through the influence of a resonant circuit, a second element creating two torques, and means for effecting a relative adjustment between the two torques of the second element to give positions of maximum sensitiveness to the indicator; substantially as described.

20. In a frequency-indicator, the combination of an element producing a torque through the influence of a resonant circuit, a second element creating two torques, said torques being adjusted to give positions of maximum sensitiveness to the indicator; substantially as described.

21. In a frequency or speed indicator, the combination of two elements relatively movable, an alternating-current circuit associated therewith, and electrically-actuated means for exerting a plurality of component reactive effects between the two elements, varying in relation with changes in frequency in said circuit, said reactive effects being in equilibrium at different positions of the movable member corresponding to different frequencies; substantially as described.

22. The combination of two elements relatively movable, an alternating-current circuit associated therewith, and means carried by each element subject to the influence of alternating currents, serving to exert a plurality of reactive effects, between the two elements, varying in relation with changes in frequency in the alternating-current circuit; substantially as described.

In testimony whereof I affix my signature in presence of two witnesses.

PAUL M. LINCOLN.

Witnesses:
PHILIP P. BARTON,
W. K. GIBBONEY.